(12) United States Patent
Xu et al.

(10) Patent No.: US 12,225,409 B2
(45) Date of Patent: Feb. 11, 2025

(54) DATA TRANSMISSION METHOD AND DEVICE

(71) Applicant: Huawei Technologies Co., Ltd., Shenzhen (CN)

(72) Inventors: Bin Xu, Beijing (CN); Bingzhao Li, Beijing (CN); Lei Chen, Beijing (CN); Hong Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 315 days.

(21) Appl. No.: 17/677,636

(22) Filed: Feb. 22, 2022

(65) Prior Publication Data
US 2022/0174541 A1 Jun. 2, 2022

Related U.S. Application Data

(63) Continuation of application No. PCT/CN2020/109887, filed on Aug. 18, 2020.

(30) Foreign Application Priority Data

Aug. 22, 2019 (CN) .................. 201910778608.X

(51) Int. Cl.
*H04L 1/08* (2006.01)
*H04W 4/06* (2009.01)
*H04W 28/06* (2009.01)
*H04W 74/08* (2024.01)

(52) U.S. Cl.
CPC ............ *H04W 28/06* (2013.01); *H04W 4/06* (2013.01)

(58) Field of Classification Search
None
See application file for complete search history.

(56) References Cited

U.S. PATENT DOCUMENTS

| 2013/0024582 A1 | 1/2013 | Rodrigues |
| 2014/0050142 A1 | 2/2014 | Song et al. |
| 2017/0012742 A1* | 1/2017 | Zhu ............... H04L 1/1614 |
| 2018/0063863 A1 | 3/2018 | Liu et al. |

FOREIGN PATENT DOCUMENTS

| CN | 101383944 A | 3/2009 |
| CN | 104283694 A | 1/2015 |
| CN | 109218123 A | 1/2019 |
| EP | 4024911 A1 | 7/2022 |
| WO | WO-2018028062 A1 * | 2/2018 ............ H04W 4/00 |

* cited by examiner

Primary Examiner — Gary Lafontant
(74) Attorney, Agent, or Firm — Leydig, Voit & Mayer, Ltd.

(57) ABSTRACT

For data transmission when a communication manner between the network device and a plurality of terminal devices is switched from a unicast manner to a multicast manner, a data transmission method includes: A network device sends first indication information to a first terminal device, where the first indication information includes a first sequence number (SN), and the first indication information is used to indicate the first terminal device to receive a data packet in a multicast manner. The network device sends the data packet to the first terminal device and a second terminal device in the multicast manner based on the first SN.

16 Claims, 7 Drawing Sheets

DATA TRANSMISSION METHOD AND DEVICE

CROSS-REFERENCE TO RELATED APPLICATIONS

This application is a continuation of International Application No. PCT/CN2020/109887, field on Aug. 18, 2020, which claims priority to Chinese Patent Application No. 201910778608.X, filed on Aug. 22, 2019. The disclosures of the aforementioned applications are hereby incorporated by reference in their entireties.

TECHNICAL FIELD

This application relates to the field of communication technologies, and in particular, to a data transmission method and a device.

BACKGROUND

In wireless communication, a network device may send a data packet to a plurality of terminal devices in a unicast manner or a multicast (or groupcast) manner. That a network device sends a data packet to a plurality of terminal devices in a unicast manner means that the network device sends the data packet on a radio bearer that is established for each terminal device and that is used for unicast transmission. That a network device sends a data packet to a plurality of terminal devices in a multicast manner means that the network device sends the data packet on a radio bearer that is established for the plurality of terminal devices and that is used for multicast transmission.

The data packet sent by the network device to the terminal device includes a packet header. The packet header carries a sequence number (SN), where the SN is used to indicate a sequence number of the data packet, and SNs of adjacent data packets are consecutive. For example, an SN of the $1^{st}$ data packet sent by the network device to the terminal device is 0, an SN of the $2^{nd}$ data packet sent by the network device to the terminal device is 1, and the rest can be deduced by analogy.

It is assumed that a network device sends a unicast service to a plurality of terminal devices at a moment in a unicast manner, and at a next moment, the network device sends a multicast service to the plurality of terminal devices in a multicast manner. In this process, how the network device sends a data packet and how each terminal device receives the data packet need to be resolved without delay.

SUMMARY

Embodiments of this application provide a data transmission method and a device, to resolve how a network device sends a data packet and how each terminal device receives the data packet when a communication manner between the network device and a plurality of terminal devices is switched from a unicast manner to a multicast manner.

To achieve the foregoing objectives, the following technical solutions are used in the embodiments of this application.

According to a first aspect, an embodiment of this application provides a data transmission method. The method includes: A network device sends first indication information to a first terminal device, where the first indication information includes a first sequence number (SN), and the first indication information is used to indicate the first terminal device to receive a data packet in a multicast manner. The network device sends the data packet to the first terminal device and a second terminal device in the multicast manner based on the first SN.

According to the technical solution provided in the first aspect, the network device may send the first indication information to the first terminal device, to indicate the first sequence number (SN) and indicate the first terminal device to receive the data packet in the multicast manner; and send the data packet to the first terminal device and the second terminal device in the multicast manner based on the first SN, so that the network device may determine, based on the first SN, an SN of the data packet to be sent to the first terminal device and the second terminal device in the multicast manner.

In a possible implementation, the first SN is determined based on a maximum sequence number SN2 of a data packet sent by the network device to the second terminal device in a unicast manner. Based on the foregoing technical solution, the network device may determine the first SN based on the maximum sequence number SN2 of the data packet sent by the network device to the second terminal device in the unicast manner; and send the first indication information including the first SN to the first terminal device, so that the network device may determine, based on the first SN, the SN of the data packet to be sent to the first terminal device and the second terminal device in the multicast manner.

In a possible implementation, when a maximum sequence number SN1 of a data packet sent by the network device to the first terminal device in the unicast manner is smaller than the maximum sequence number SN2 of the data packet sent by the network device to the second terminal device in the unicast manner, the method further includes: The network device sends a first data packet to the first terminal device in the unicast manner, where the first data packet is a data packet including only a packet header, and an SN of the first data packet includes SN2 and/or at least one SN between SN2 and SN1. Alternatively, the network device sends a first data packet to the first terminal device in the unicast manner, where an SN of the first data packet includes SN2 and/or at least one SN between SN2 and SN1. Based on the foregoing technical solution, when the maximum sequence number SN1 of the data packet sent by the network device to the first terminal device in the unicast manner is smaller than the maximum sequence number SN2 of the data packet sent by the network device to the second terminal device in the unicast manner, the network device may send the data packet whose sequence number includes SN2 and/or at least one SN between SN2 and SN1 and that includes only the packet header to the first terminal device, to prevent a receiving hole from occurring on the first terminal device when a communication manner between the network device and the first terminal device is switched from the unicast manner to the multicast manner. Alternatively, when the maximum sequence number SN1 of the data packet sent by the network device to the first terminal device in the unicast manner is smaller than the maximum sequence number SN2 of the data packet sent by the network device to the second terminal device in the unicast manner, the network device may send the data packet whose sequence number includes SN2 and/or at least one SN between SN2 and SN1 to the first terminal device, so that the network device may continue to transmit an untransmitted data packet to the first terminal device in the unicast manner after a communication manner between the network device and the first terminal device is switched from the unicast manner to the multicast manner.

In a possible implementation, when a maximum sequence number SN1 of a data packet sent by the network device to the first terminal device in the unicast manner is larger than the maximum sequence number SN2 of the data packet sent by the network device to the second terminal device in the unicast manner, the method further includes: The network device sends second indication information to the first terminal device, where the second indication information is used to indicate an SN of a data packet on which the first terminal device is to skip performing duplicate detection, and the SN of the data packet on which duplicate detection is to be skipped includes SN1 and/or at least one SN between SN1 and SN2. Based on the foregoing technical solution, when the maximum sequence number SN1 of the data packet sent by the network device to the first terminal device in the unicast manner is larger than the maximum sequence number SN2 of the data packet sent by the network device to the second terminal device in the unicast manner, the network device may send the second indication information to the first terminal device, where the second indication information is used to indicate the SN of the data packet on which the first terminal device is to skip performing duplicate detection, so that the first terminal device may receive, after a communication manner between the network device and the first terminal device is switched from the unicast manner to the multicast manner, the data packet sent by the network device in the multicast manner.

In a possible implementation, the first indication information is carried in a control protocol data unit (PDU), a media access control control element, radio resource control signaling, or downlink control information. Based on the foregoing technical solution, the network device may send the first indication information to the first terminal device by using the control protocol data unit PDU, the media access control control element, the radio resource control signaling, or the downlink control information, so that the network device may determine, based on the first SN after the communication manner between the network device and each of the first terminal device and the second terminal device is switched from the unicast manner to the multicast manner, the SN of the data packet to be sent to the first terminal device and the second terminal device in the multicast manner.

In a possible implementation, the second indication information is carried in a control protocol data unit (PDU), a media access control control element, radio resource control signaling, or downlink control information. Based on the foregoing technical solution, when the maximum sequence number SN1 of the data packet sent by the network device to the first terminal device in the unicast manner is larger than the maximum sequence number SN2 of the data packet sent by the network device to the second terminal device in the unicast manner, the network device may send the second indication information to the first terminal device by using the control PDU, the media access control control element, the radio resource control signaling, or the downlink control information, so that the first terminal device may receive, after the communication manner between the network device and the first terminal device is switched from the unicast manner to the multicast manner, the data packet sent by the network device in the multicast manner.

According to a second aspect, an embodiment of this application provides a data transmission method. The method includes: A first terminal device receives first indication information from a network device, where the first indication information includes a first sequence number SN, and the first indication information is used to indicate the first terminal device to receive a data packet in a multicast manner. The first terminal device receives the data packet from the network device in the multicast manner based on the first SN.

According to the technical solution provided in the second aspect, the first terminal device receives the first indication information from the network device, and may receive the data packet from the network device in the multicast manner based on the first SN, so that the first terminal device may determine, based on the first SN, an SN of the data packet to be received from the network device in the multicast manner.

In a possible implementation, that the first terminal device receives the data packet from the network device in the multicast manner based on the first SN includes: The first terminal device determines, based on the first SN, an SN corresponding to a lower edge of a receive window in which the first terminal device is to receive the data packet in the multicast manner. Alternatively, the first terminal device determines, based on the first SN, an SN of an initial data packet to be received by the first terminal device in the multicast manner. Based on the foregoing technical solution, the first terminal device may determine, based on the first SN, the SN corresponding to the lower edge of the receive window in which the first terminal device is to receive the data packet in the multicast manner, or determine the SN of the initial data packet to be received by the first terminal device in the multicast manner, so that the first terminal device may determine, based on the first SN, the SN of the data packet to be received from the network device in the multicast manner.

In a possible implementation, the first SN is determined based on a maximum sequence number SN2 of a data packet sent by the network device to the second terminal device in the unicast manner. Based on the foregoing technical solution, the first SN is determined by the network device based on the maximum sequence number SN2 of the data packet sent by the network device to the second terminal device in the unicast manner. When the first terminal device receives the first SN, the first terminal device may receive the data packet from the network device in the multicast manner based on the first SN, so that the first terminal device may determine, based on the first SN, the SN of the data packet to be received from the network device in the multicast manner.

In a possible implementation, when a maximum sequence number SN1 of a data packet sent by the network device to the first terminal device in the unicast manner is smaller than the maximum sequence number SN2 of the data packet sent by the network device to the second terminal device in the unicast manner, the method further includes: The first terminal device receives a first data packet from the network device in the unicast manner, where the first data packet is a data packet including only a packet header, and an SN of the first data packet includes SN2 and/or at least one SN between SN2 and SN1. Alternatively, the first terminal device receives a first data packet from the network device in the unicast manner, where an SN of the first data packet includes SN2 and/or at least one SN between SN2 and SN1. Based on the foregoing technical solution, when the maximum sequence number SN1 of the data packet sent by the network device to the first terminal device in the unicast manner is smaller than the maximum sequence number SN2 of the data packet sent by the network device to the second terminal device in the unicast manner, the first terminal device may receive the data packet whose sequence number includes SN2 and/or at least one SN between SN2 and SN1 and that includes only the packet header from the network device, to prevent a receiving hole from occurring on the first terminal device when a communication manner between the network device and the first terminal device is switched from the unicast manner to the multicast manner. Alternatively, when the maximum sequence number SN1 of the data packet sent by the network device to the first terminal device in the unicast manner is smaller than the maximum sequence number SN2 of the data packet sent by the network device to the second terminal device in the unicast manner, the first terminal device may receive the data packet whose sequence number includes SN2 and/or at least one SN between SN2 and SN1 from the network device, so that the first terminal device may continue to receive an untransmitted data packet from the network device in the unicast manner after a communication manner between the network device and the first terminal device is switched from the unicast manner to the multicast manner.

In a possible implementation, when a maximum sequence number SN1 of a data packet sent by the network device to the first terminal device in the unicast manner is larger than the maximum sequence number SN2 of the data packet sent by the network device to the second terminal device in the unicast manner, the method further includes: The first terminal device receives second indication information from the network device, where the second indication information is used to indicate an SN of a data packet on which the first terminal device is to skip performing duplicate detection, and the SN of the data packet on which duplicate detection is to be skipped includes SN1 and/or at least one SN between SN1 and SN2. Based on the foregoing technical solution, when the maximum sequence number SN1 of the data packet sent by the network device to the first terminal device in the unicast manner is larger than the maximum sequence number SN2 of the data packet sent by the network device to the second terminal device in the unicast manner, the first terminal device may receive the second indication information from the network device, where the second indication information is used to indicate the SN of the data packet on which the first terminal device is to skip performing duplicate detection, so that the first terminal device may receive, after a communication manner between the network device and the first terminal device is switched from the unicast manner to the multicast manner, the data packet sent by the network device in the multicast manner.

In a possible implementation, the first indication information is carried in a control PDU, a media access control control element, radio resource control signaling, or downlink control information. Based on the foregoing technical solution, the first terminal device may receive the first indication information from the network device by using the control PDU, the media access control control element, the radio resource control signaling, or the downlink control information, so that the first terminal device may determine, based on the first SN after the communication manner between the network device and each of the first terminal device and the second terminal device is switched from the unicast manner to the multicast manner, the SN of the data packet to be received from the network device in the multicast manner.

In a possible implementation, the second indication information is carried in a control PDU, a media access control control element, radio resource control signaling, or downlink control information. Based on the foregoing technical solution, when the maximum sequence number SN1 of the data packet sent by the network device to the first terminal device in the unicast manner is larger than the maximum sequence number SN2 of the data packet sent by the network device to the second terminal device in the unicast manner, the first terminal device may receive the second indication information from the network device by using the control PDU, the media access control control element, the radio resource control signaling, or the downlink control information, so that the first terminal device may receive, after the communication manner between the network device and the first terminal device is switched from the unicast manner to the multicast manner, the data packet sent by the network device in the multicast manner.

According to a third aspect, an embodiment of this application provides a first terminal device. The first terminal device has a function of implementing the method according to the first aspect. The function may be implemented by hardware, or may be implemented by hardware executing corresponding software. The hardware or the software includes one or more modules corresponding to the function.

According to a fourth aspect, an embodiment of this application provides a network device. The network device has a function of implementing the method according to the second aspect. The function may be implemented by hardware, or may be implemented by hardware executing corresponding software. The hardware or the software includes one or more modules corresponding to the function.

According to a fifth aspect, an embodiment of this application provides a communication apparatus, including at least one processor, at least one memory, and a communication interface. The communication interface, the at least one memory, and the at least one processor are coupled. The communication apparatus communicates with another device by using the communication interface. The at least one memory is configured to store a computer program, so that when the computer program is executed by the at least one processor, the data transmission method according to the first aspect and the possible implementations of the first aspect is implemented.

According to a sixth aspect, an embodiment of this application provides a communication apparatus, including at least one processor, at least one memory, and a communication interface. The communication interface, the at least one memory, and the at least one processor are coupled. The communication apparatus communicates with another device by using the communication interface. The at least one memory is configured to store a computer program, so that when the computer program is executed by the at least one processor, the data transmission method according to the second aspect and the possible implementations of the second aspect is implemented.

According to a seventh aspect, this application provides a system chip. The system chip may be used in a communication apparatus. The system chip includes at least one processor. Related program instructions are executed by the at least one processor, to implement a function of the first terminal device in the method according to any one of the first aspect and the design of the first aspect. Optionally, the system chip may further include at least one memory. The memory stores the related program instructions.

According to an eighth aspect, this application provides a system chip. The system chip may be used in a communication apparatus. The system chip includes at least one processor. Related program instructions are executed by the at least one processor, to implement a function of the network device in the method according to the second aspect and any design of the method according to the second aspect. Optionally, the system chip may further include at least one memory. The memory stores the related program instructions.

According to a ninth aspect, an embodiment of this application provides a computer-readable storage medium, for example, a non-transient computer-readable storage medium. The computer-readable storage medium stores a computer program. When the computer program is run on a computer, the computer is enabled to perform any possible method according to the first aspect. For example, the computer may be at least one storage node.

According to a tenth aspect, an embodiment of this application provides a computer-readable storage medium, for example, a non-transient computer-readable storage medium. The computer-readable storage medium stores a computer program. When the computer program is run on a computer, the computer is enabled to perform any possible method according to the second aspect. For example, the computer may be at least one storage node.

According to an eleventh aspect, an embodiment of this application provides a computer program product. When the computer program product is run on a computer, any method provided in the first aspect is enabled to be performed. For example, the computer may be at least one storage node.

According to a twelfth aspect, an embodiment of this application provides a computer program product. When the computer program product is run on a computer, any method provided in the second aspect is enabled to be performed. For example, the computer may be at least one storage node.

According to a thirteenth aspect, an embodiment of this application provides a communication system. The communication system may include any one or more of the following: the first terminal device according to the third aspect, the network device according to the fourth aspect, the communication apparatus according to the fifth aspect, the communication apparatus according to the sixth aspect, the system chip according to the seventh aspect, the system chip according to the eighth aspect, the computer storage medium according to the ninth aspect, the computer storage medium according to the tenth aspect, the computer program product according to the eleventh aspect, or the computer program product according to the twelfth aspect.

It may be understood that any first terminal device, network device, communication apparatus, system chip, computer storage medium, computer program product, communication system, or the like provided above is configured to perform a corresponding method provided above. Therefore, for beneficial effects that can be achieved by the first terminal device, network device, communication apparatus, system chip, computer storage medium, computer program product, communication system, or the like, refer to the beneficial effects in the corresponding method. Details are not described herein again.

DESCRIPTION OF EMBODIMENTS

Figure 1:
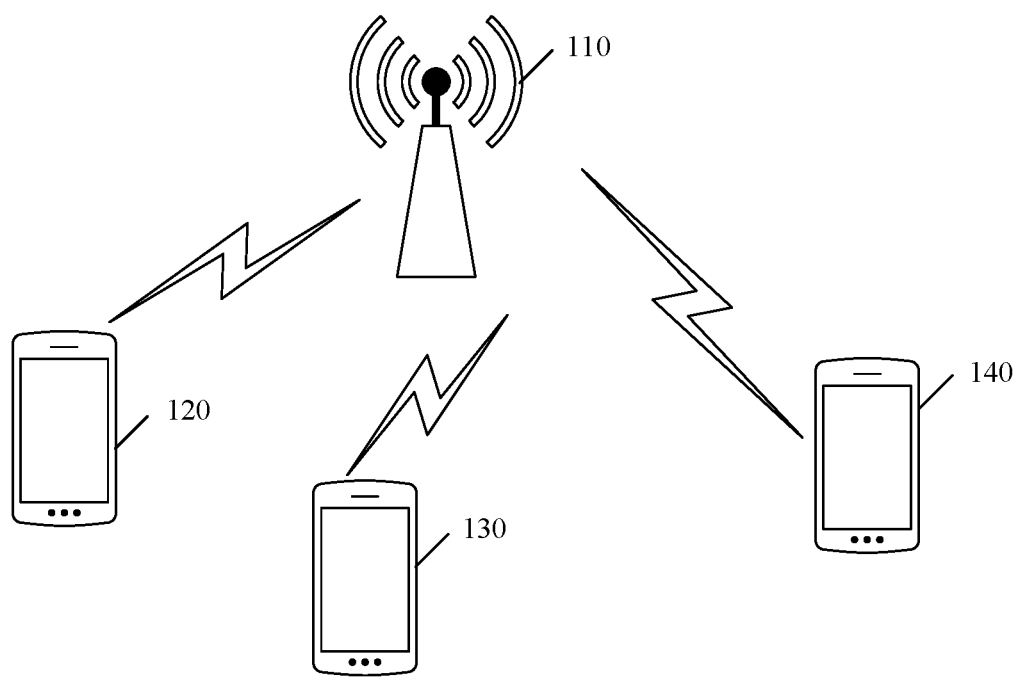
FIG. 1 is a schematic diagram of an architecture of a communication system according to an embodiment of this application.

The following describes implementations of embodiments of this application in detail with reference to accompanying drawings.

For ease of understanding embodiments of this application, the following describes some terms in embodiments of this application, to help a person skilled in the art have a better understanding.

(1) Network device: The network device is a device that can provide a random access function for a terminal device or a chip that can be disposed in the device. The device includes but is not limited to: an evolved NodeB (eNB), a radio network controller (RNC), a NodeB (NB), a base station controller (BSC), a base transceiver station (BTS), a home base station (for example, a home evolved NodeB or home Node B, HNB), a baseband unit (BBU), an access point (AP) in a wireless fidelity (Wi-Fi) system, a wireless relay node, a wireless backhaul node, a transmission point (transmission and reception point, TRP or transmission point, TP), or the like, may be a gNB or a transmission point (TRP or TP) in a 5G system such as an NR system or one antenna panel or one group of antenna panels (including a plurality of antenna panels) of a base station in a 5G system, or may be a network node forming a gNB or a transmission point, for example, a baseband unit (BBU) or a distributed unit (DU).

(2) Terminal device: The terminal device is also referred to as user equipment (UE), a mobile station (MS), a mobile terminal (MT), or the like, and is a device that provides voice and/or data connectivity for a user. For example, the terminal device includes a handheld device, a vehicle-mounted device, or the like that has a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self driving, a wireless terminal in remote medical surgery, a wireless terminal in a smart grid, a wireless terminal in transportation safety, a wireless terminal in a smart city, a wireless terminal in a smart home, or the like.

(3) Sending or transmitting a data packet in a multicast manner refers to: When sending a transport block (TB) corresponding to the data packet, a device scrambles the data packet or downlink control information (DCI) corresponding to the data packet by using a group-radio network temporary identifier (G-RNTI), and one or more devices receive the same data packet based on the same G-RNTI. Alternatively, transmitting a data packet in a multicast manner may refer to: A plurality of devices are informed of a location of the same data packet in a semi-static manner, and may simultaneously receive the data packet. Alternatively, transmitting a data packet in a multicast manner may refer to transmitting the data packet on a radio bearer established for multicast transmission or on a channel specially designed for multicast.

Correspondingly, receiving the data packet in the multicast manner refers to: When the multicast manner is used for receiving, one of the plurality of receiving devices receives the data packet based on the G-RNTI, or one of the plurality of receiving devices receives the data packet on the radio bearer established for multicast transmission or on the channel used for multicast transmission.

In this application, groupcast is a specific mode of multicast. Therefore, multicast may also be referred to as groupcast.

(4) Sending or transmitting a data packet in a unicast (unicast) manner refers to: When sending a TB corresponding to the data packet, a device scrambles the data packet or DCI corresponding to the data packet by using a cell radio network temporary identifier (C-RNTI), and only one device receives the same data packet based on the C-RNTI. Alternatively, transmitting a data packet in a unicast manner may refer to transmitting the data packet on a radio bearer established for unicast transmission or on a channel specially designed for unicast.

Correspondingly, receiving the data packet in the unicast manner refers to: When the unicast manner is used for receiving, the receiving device receives the data packet based on the C-RNTI, or the device receives the data packet on the radio bearer established for unicast transmission or on the channel used for unicast transmission.

(5) Sending or transmitting a data packet in a broadcast manner refers to: When a device sends a TB corresponding to the data packet on a broadcast channel, all receiving devices may receive the data packet on the broadcast channel.

The term "and/or" in this application describes an association relationship between associated objects and indicates that three relationships may exist. For example, A and/or B may indicate the following three cases: Only A exists, both A and B exist, and only B exists. The character "/" usually indicates an "or" relationship between the associated objects.

"A plurality of" in this application means two or more.

In the description of this application, terms such as "first" and "second" are merely used for distinction and description, and should not be understood as an indication or implication of relative importance, or as an indication or implication of a sequence.

In addition, the word "example" in the embodiments of this application is used to represent giving an example, an illustration, or a description. Any embodiment or implementation solution described as an "example" in this application should not be explained as being more preferred or having more advantages than another embodiment or implementation solution. Exactly, the term "example" is used to present a concept in a specific manner.

A service scenario described in the embodiments of this application is intended to describe technical solutions in the embodiments of this application more clearly, but constitutes no limitation on the technical solutions provided in the embodiments of this application. A person of ordinary skill in the art may learn that the technical solutions provided in the embodiments of this application are also applicable to a similar technical problem as a new service scenario emerges.

The embodiments of this application provide a data transmission method, a device, and a system. The method, the device, and the system are based on a same technical concept. Because problem-resolving principles of the method, the device, and the system are similar, implementations of the device, the system, and the method may be mutually referenced. Repeated parts are not described.

The technical solutions in the embodiments of this application may be applied to various communication systems, for example, a long term evolution (LTE) system, a worldwide interoperability for microwave access (WiMAX) communication system, a future 5th generation (5G) system, for example, a new radio access technology (NR), and a future communication system.

This application is applicable to a terrestrial communication system or a non-terrestrial communication system, for example, a communication system in which a base station is located on a satellite or another flight device, or a communication system in which a satellite or a flight device is used as a relay for forwarding. Alternatively, this application is applicable to a 5G architecture-based scenario in which communication is performed by using an unlicensed spectrum, for example, an NR-U (new radio-unlicensed) scenario.

For ease of understanding the embodiments of this application, the following describes an application scenario of this application by using a communication system shown in FIG. 1.

As shown in FIG. 1, a communication system includes a network device (base station) 110 and terminal devices 120 to 140. In the communication system, the network device 110 may send data packets to the terminal devices 120 to 140 in a unicast manner, and the terminal devices 120 to 140 may receive the data packets from the network device 110 in the unicast manner. At a moment, a communication manner between the network device 110 and the terminal devices 120 to 140 may be switched from the unicast manner to a multicast manner. After the switching, the network device 110 may send a data packet to the terminal devices 120 to 140 in the multicast manner, and the terminal devices 120 to 140 may receive the data packet from the network device 110 in the multicast manner. The device that sends the data packet is the base station, and the devices that receive the data packet are the terminal devices 120 to 140. The terminal devices 120 to 140 may be considered as a plurality of terminal devices that receive a same multicast service in a same time period, and these terminal devices may be located in a same multicast group or in a same multicast area (including one or more cells).

In FIG. 1, the data packet sent by the network device 110 to the terminal devices 120 to 140 in the unicast manner or the multicast manner includes a packet header, where the packet header carries an SN. When the network device 110 performs unicast communication with the terminal device 120, the terminal device 130, and the terminal device 140, maximum SNs of the data packets sent by the network device 110 to the terminal devices in the unicast manner at a same moment may be different due to reasons such as different network access time points of the terminal devices, different data transmission speeds, and the like. Therefore, when the communication manner between the network device 110 and the terminal device 120, the terminal device 130, and the terminal device 140 is switched from the unicast manner to the multicast manner, because the maximum SNs numbers of the data packets previously sent to the terminal device 120, the terminal device 130, and the terminal device 140 in the unicast manner are different, the network device cannot determine, if no processing is performed, an SN to be used for sending in the multicast manner, and consequently, cannot perform data transmission in the multicast manner.

Figure 2:
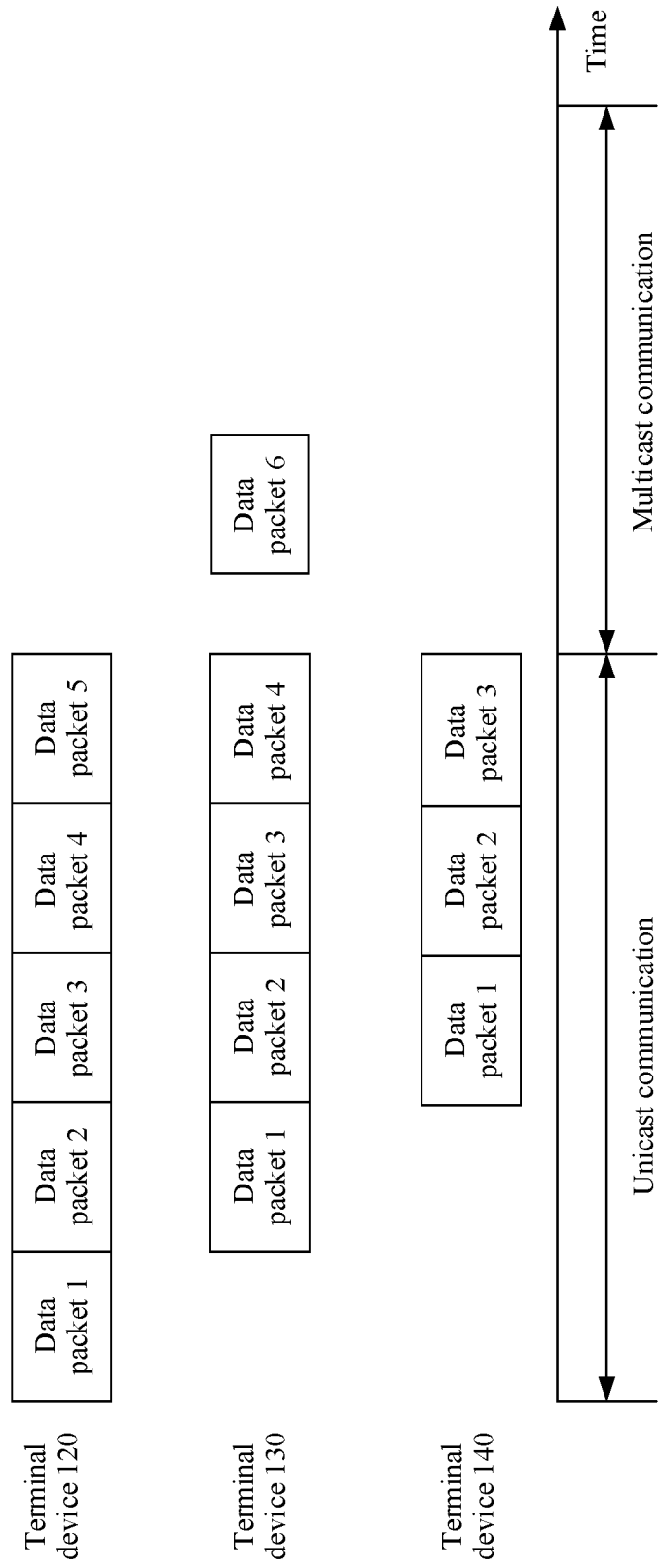
FIG. 2 is a schematic diagram 1 of data transmission according to an embodiment of this application.

For example, in FIG. 2, the network device 110 sends a data packet 1 to a data packet 5 to the terminal device 120 in the unicast manner, where SNs of the data packet 1 to the data packet 5 are respectively 1, 2, 3, 4, and 5. The network device 110 sends the data packet 1 to the data packet 4 to the terminal device 130 in the unicast manner, where SNs of the data packet 1 to the data packet 4 are respectively 1, 2, 3, and 4. The network device 110 sends the data packet 1 to the data packet 3 to the terminal device 140 in the unicast manner, where SNs of the data packet 1 to the data packet 3 are respectively 1, 2, and 3. In this case, if the communication manner between the network device 110 and the terminal device 120, the terminal device 130, and the terminal device 140 is switched from the unicast manner to the multicast manner, and the network device is to send a data packet 6 to the terminal device 120, the terminal device 130, and the terminal device 140 in the multicast manner; and if continuity of SNs needs to be ensured, an SN of the data packet 6 should be 6 for the terminal device 120, should be 5 for the terminal device 130, and should be 4 for the terminal device 140. In this case, the network device 110 cannot perform multicast transmission because the network device 110 cannot determine an SN of an initial data packet to be sent to the terminal device 120, the terminal device 130, and the terminal device 140 in the multicast manner. In addition, the terminal device cannot determine the SN of the initial data packet to be received in the multicast manner. The SN of the initial data packet is an SN of the 1$^{st}$ data packet sent by the network device in the multicast manner, or an SN of the 1$^{st}$ data packet received by the terminal device in the multicast manner.

To resolve the foregoing problem, the embodiments of this application provide a data transmission method. The method includes: A network device may send first indication information including a first SN to a first terminal device, where the first indication information may be used to indicate the first terminal device to receive a data packet in a multicast manner, or the first indication information may be used to indicate related configuration information about a multicast manner, or the first indication information may be used to indicate an SN of the 1$^{st}$ data packet to be sent or received in a multicast manner. The network device may send the data packet to the first terminal device and a second terminal device in the multicast manner based on the first SN. Indication information used to indicate the first terminal device to receive the data packet in the multicast manner or indication information used to indicate the related configuration information about the multicast manner may alternatively be indication information other than the first indication information. For description of the data transmission method, refer to the following description in a method shown in FIG. 4.

Optionally, the network elements (for example, the network device 110 and the terminal device 120) in FIG. 1 may be implemented by one device, or may be jointly implemented by a plurality of devices, or may be a function module in a device. This is not specifically limited in the embodiments of this application. It may be understood that the foregoing functions may be network elements in a hardware device, or may be software functions running on dedicated hardware, or may be virtualization functions instantiated on a platform (for example, a cloud platform).

Figure 3:
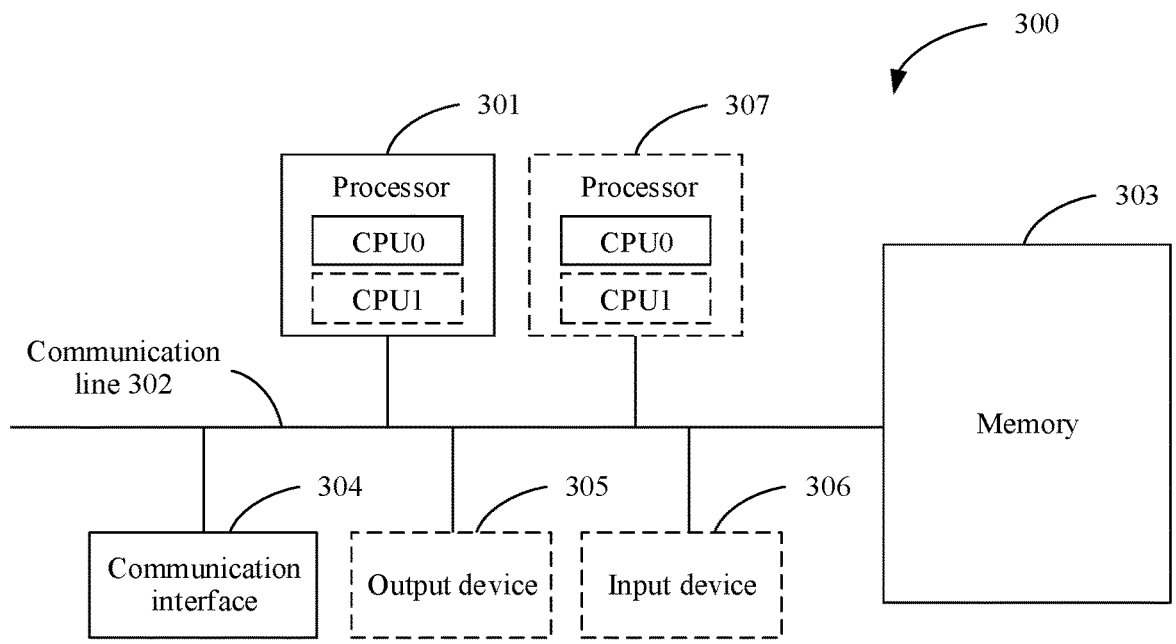
FIG. 3 is a schematic diagram of a hardware structure of a communication device according to an embodiment of this application.

For example, each network element in FIG. 1 may be implemented by using a communication device 300 in FIG. 3. FIG. 3 is a schematic diagram of a hardware structure of a communication device to which an embodiment of this application is applicable. The communication device 300 may include at least one processor 301, a communication line 302, a memory 303, and at least one communication interface 304.

The processor 301 may be a general-purpose central processing unit (CPU), a microprocessor, an application-specific integrated circuit (ASIC), or one or more integrated circuits configured to control program execution of the solutions in this application.

The communication line 302 may include a path for transferring information among the foregoing components, for example, a bus.

The communication interface 304 uses any apparatus such as a transceiver, and is configured to communicate with another device or a communication network, for example, an Ethernet interface, a radio access network (RAN) interface, or a wireless local area network (WLAN) interface.

The memory 303 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another optical disc storage, an optical disc storage (including a compressed optical disc, a laser disc, an optical disc, a digital versatile disc, or a Blu-ray disc), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through the communication line 302. The memory may alternatively be integrated with the processor. The memory provided in the embodiments of this application may generally be non-volatile. The memory 303 is configured to store computer-executable instructions for executing the solutions in this application, and the processor 301 controls the execution. The processor 301 is configured to execute the computer-executable instructions stored in the memory 303, to implement the method provided in the embodiments of this application.

Optionally, the computer-executable instructions in this embodiment of this application may also be referred to as application program code. This is not specifically limited in this embodiment of this application.

In a specific implementation, in an embodiment, the processor 301 may include one or more CPUs, for example, a CPU 0 and a CPU 1 in FIG. 3.

In a specific implementation, in an embodiment, the communication device 300 may include a plurality of processors, for example, the processor 301 and a processor 307 in FIG. 3. Each of the processors may be a single-core (single-CPU) processor or a multi-core (multi-CPU) processor. The processor herein may be one or more devices, circuits, and/or processing cores configured to process data (for example, computer program instructions).

In a specific implementation, in an embodiment, the communication device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive an input of a user in a plurality of manners. For example, the input device 306 may be a mouse, a keyboard, a touchscreen device, or a sensor device.

In a specific implementation, the communication device 300 may be a network server, a palmtop computer (PDA), a mobile phone, a tablet computer, a wireless terminal device, an embedded device, or a device having a structure similar to that in FIG. 3. A type of the communication device 300 is not limited in this embodiment of this application.

The following describes in detail the data transmission method provided in the embodiments of this application with reference to FIG. 1, FIG. 2, and FIG. 3. A network element in the following embodiments may have the components shown in FIG. 3.

It should be noted that names of messages between network elements, names of parameters in the messages, or the like in the following embodiments of this application are merely examples, and there may be other names in a specific implementation. This is not specifically limited in the embodiments of this application.

It may be understood that, in the embodiments of this application, a network device or a terminal device may perform some or all of steps in the embodiments of this application. The steps are merely examples. In the embodiments of this application, other steps or variations of various steps may alternatively be performed. In addition, the steps may be performed in a sequence different from a sequence presented in the embodiments of this application, and not all steps in the embodiments of this application may need to be performed.

Figure 4:
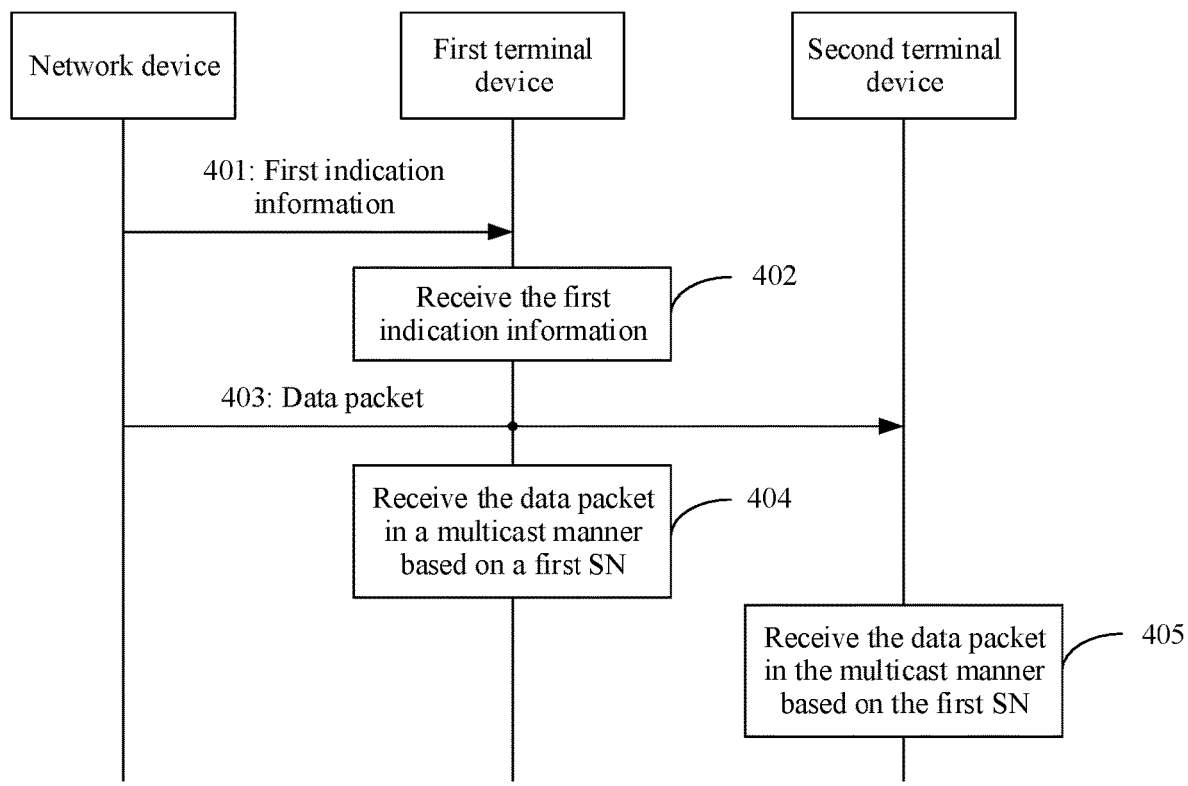
FIG. 4 is a schematic flowchart 1 of a data transmission method according to an embodiment of this application.

FIG. 4 is a flowchart of a data transmission method according to an embodiment of this application. Before the method shown in FIG. 4 is performed, a network device communicates with a first terminal device and a second terminal device in a unicast manner. As shown in FIG. 4, the data transmission method includes step 401 to step 405.

Step 401: The network device sends first indication information to the first terminal device.

The network device may be the network device 110 in FIG. 1. The first terminal device may be any one or more of the terminal devices 120 to 140 in FIG. 1.

The first indication information may be used to indicate the first terminal device to receive a data packet in a multicast manner.

In a possible implementation, the first indication information includes a first SN. By using the first SN included in the first indication information, the network device indicates the first terminal device to receive the data packet in the multicast manner, and indicates an SN of an initial data packet to be received by the first terminal device in the multicast manner.

For example, the first indication information includes the first SN, where the first SN is 5. In this case, by using the first indication information, the network device may indicate the first terminal device to receive the data packet in the multicast manner, and indicate that the SN of the initial data packet to be received by the first terminal device in the multicast manner is 5.

In another possible implementation, the first indication information includes a first SN and N-bit indication information, where the first SN is used to indicate an SN of an initial data packet to be received by the first terminal device in the multicast manner, and the N-bit indication information is used to indicate the first terminal device to receive the data packet in the multicast manner, where N is a positive integer.

For example, the first indication information includes the first SN and 1-bit indication information, where the first SN is equal to 5, and the 1-bit indication information includes 1. 5 may be used to indicate that the SN of the initial data packet to be received by the first terminal device in the multicast manner is 5, and 1 may be used to indicate the first terminal device to receive the data packet in the multicast manner.

In another possible implementation, the first indication information includes a first SN and M-bit indication information, where the first SN is used to indicate an SN of an initial data packet to be received by the first terminal device in the multicast manner, and the M-bit indication information is used to indicate related configuration information about receiving the data packet by the first terminal device in the multicast manner.

N and M are positive integers, and N and M may be the same or different.

The related configuration information about receiving the data packet in the multicast manner may include information such as a G-RNTI that is used to scramble the data packet or DCI corresponding to the data packet and time-frequency resources of the data packet.

For example, the first indication information includes the first SN and 3-bit indication information, where the first SN is equal to 2, and the 3-bit indication information includes time-frequency resource information of the data packet. 2 may be used to indicate that an SN of an initial data packet to be received by the first terminal device in the multicast manner is 2, and the time-frequency resource information may be used to indicate the time-frequency resources of the data packet to be received by the first terminal device in the multicast manner. Optionally, the first SN is determined based on a maximum sequence number SN2 of a data packet sent by the network device to the second terminal device in the unicast manner.

The second terminal device may be any one of the terminal devices 120 to 140 in FIG. 1.

That the first SN is determined based on a maximum sequence number SN2 of a data packet sent by the network device to the second terminal device in the unicast manner includes: The network device uses SN2 as the first SN, or the network device uses, as the first SN, an SN obtained by adding 1 to SN2, or the network device determines the first SN based on a fixed calculation relationship. The calculation relationship is not limited herein.

The maximum sequence number SN2 of the data packet sent by the network device to the second terminal device in the unicast manner may be in the following three cases.

Case 1: The maximum sequence number SN2 of the data packet sent by the network device to the second terminal device in the unicast manner is a largest sequence number $SN_{max}$ of maximum sequence numbers of data packets sent by the network device to a plurality of terminal devices in the unicast manner. In this case, the second terminal device is one or more terminal devices, among the plurality of terminal devices, whose maximum sequence number of a data packet is equal to $SN_{max}$.

It should be noted that, in the case 1, the first terminal device may be one or more terminal devices, among the plurality of terminal devices, whose maximum sequence number of a data packet is smaller than $SN_{max}$.

FIG. 2 is used as an example. A data packet that is sent by the network device 110 to the terminal device 120 in the unicast manner and that has a maximum sequence number is the data packet 5, and an SN of the data packet 5 is 5. Therefore, the maximum sequence number of the data packet sent by the network device 110 to the terminal device 120 in the unicast manner is 5. A data packet that is sent by the network device 110 to the terminal device 130 in the unicast manner and that has a maximum sequence number is the data packet 4, and an SN of the data packet 4 is 4. Therefore, the maximum sequence number of the data packet sent by the network device 110 to the terminal device 130 in the unicast manner is 4. A data packet that is sent by the network device 110 to the terminal device 140 in the unicast manner and that has a maximum sequence number is the data packet 3, and an SN of the data packet 3 is 3. Therefore, the maximum sequence number of the data packet sent by the network device 110 to the terminal device 140 in the unicast manner is 3. Therefore, in the case 1, the second terminal device is the terminal device 120, and SN2 is equal to 5. The first terminal device may be the terminal device 130 and the terminal device 140.

Case 2: The maximum sequence number SN2 of the data packet sent by the network device to the second terminal device in the unicast manner is a smallest sequence number $SN_{min}$ of maximum sequence numbers of data packets sent by the network device to a plurality of terminal devices in the unicast manner. In this case, the second terminal device is one or more terminal devices, among the plurality of terminal devices, whose maximum sequence number of a data packet is equal to $SN_{min}$.

It should be noted that, in the case 2, the first terminal device may be one or more terminal devices, among the plurality of terminal devices, whose maximum sequence number of a data packet is larger than $SN_{min}$.

FIG. 2 is used as an example. A data packet that is sent by the network device 110 to the terminal device 120 in the unicast manner and that has a maximum sequence number is the data packet 5, and an SN of the data packet 5 is 5. Therefore, the maximum sequence number of the data packet sent by the network device 110 to the terminal device 120 in the unicast manner is 5. A data packet that is sent by the network device 110 to the terminal device 130 in the unicast manner and that has a maximum sequence number is the data packet 4, and an SN of the data packet 4 is 4. Therefore, the maximum sequence number of the data packet sent by the network device 110 to the terminal device 130 in the unicast manner is 4. A data packet that is sent by the network device 110 to the terminal device 140 in the unicast manner and that has a maximum sequence number is the data packet 3, and an SN of the data packet 3 is 3. Therefore, the maximum sequence number of the data packet sent by the network device 110 to the terminal device 140 in the unicast manner is 3. Therefore, in the case 2, the second terminal device is the terminal device 140, and SN2 is equal to 3. The first terminal device may be the terminal device 120 and the terminal device 130.

Case 3: The maximum sequence number SN2 of the data packet sent by the network device to the second terminal device in the unicast manner is $SN_{mid}$, where $SN_{mid}$ is any one of maximum sequence numbers of data packets sent by the network device to a plurality of terminal devices in the unicast manner and that is larger than $SN_{min}$ and smaller than $SN_{max}$. In this case, the second terminal device is one or more terminal devices, among the plurality of terminal devices, whose maximum sequence number of a data packet is equal to $SN_{mid}$.

It should be noted that, in the case 3, the first terminal device may be one or more terminal devices, among the plurality of terminal devices, whose maximum sequence number of a data packet is not equal to $SN_{mid}$.

FIG. 2 is used as an example. A data packet that is sent by the network device 110 to the terminal device 120 in the unicast manner and that has a maximum sequence number is the data packet 5, and an SN of the data packet 5 is 5. Therefore, the maximum sequence number of the data packet sent by the network device 110 to the terminal device 120 in the unicast manner is 5. A data packet that is sent by the network device 110 to the terminal device 130 in the unicast manner and that has a maximum sequence number is the data packet 4, and an SN of the data packet 4 is 4. Therefore, the maximum sequence number of the data packet sent by the network device 110 to the terminal device 130 in the unicast manner is 4. A data packet that is sent by the network device 110 to the terminal device 140 in the unicast manner and that has a maximum sequence number is the data packet 3, and an SN of the data packet 3 is 3. Therefore, the maximum sequence number of the data packet sent by the network device 110 to the terminal device 140 in the unicast manner is 3. Therefore, in the case 3, the second terminal device is the terminal device 130, and SN2 is equal to 4. The first terminal device may be the terminal device 120 and the terminal device 140.

In addition, in the foregoing cases, the first terminal device and the second terminal device may alternatively be a same device, and both the first device and the second device may be one or more devices.

Optionally, the first indication information is carried in a control protocol data unit (PDU), a media access control (MAC) control element (CE), radio resource control (RRC) signaling, or downlink control information (DCI).

For example, the network device sends RRC to the first terminal device, where the RRC carries the first indication information.

Optionally, if a communication manner between the network device and each of the first terminal device and the second terminal device is switched from unicast communication to multicast communication, the network device sends the first indication information to the first terminal device.

That a communication manner between the network device and each of the first terminal device and the second terminal device is switched from unicast communication to multicast communication includes: The network device receives indication information from a core network, where the indication information is used to indicate that the communication manner between the network device and each of the first terminal device and the second terminal device is switched from the unicast communication to the multicast communication. Alternatively, the network device determines that the communication manner between the network device and each of the first terminal device and the second terminal device is switched from the unicast communication to the multicast communication.

Optionally, if the network device receives no response information of the first indication information from the first terminal device within a first preset time period after the network device sends the first indication information to the first terminal device, the network device sends the first indication information to the first terminal device again, where the response information of the first indication information is used to indicate, to the network device, that the first terminal device has received the first indication information.

The network device may send the first indication information to the second terminal device before sending the first indication information to the first terminal device; the network device may send the first indication information to the second terminal device after sending the first indication information to the first terminal device; or the network device may simultaneously send the first indication information to the first terminal device and the second terminal device, to indicate the second terminal device to receive the data packet in the multicast manner and to receive the data packet from the network device in the multicast manner based on the first SN.

Optionally, if the network device receives no response information of the first indication information from the second terminal device within a second preset time period after the network device sends the first indication information to the second terminal device, the network device sends the first indication information to the second terminal device again, where the response information of the first indication information is used to indicate that the second terminal device has received the first indication information.

The second preset time period and the first preset time period may be the same or different.

Step 402: The first terminal device receives the first indication information from the network device.

The first terminal device receives the first indication information from the network device, and may determine at least one of the following based on the first indication information: the communication manner between the network device and the first terminal device is switched from the unicast manner to the multicast manner, the related configuration information about receiving the data packet by the first terminal device in the multicast manner, and the SN of the initial data packet that is to be received by the first terminal device in the multicast manner.

Step 403: The network device sends the data packet to the first terminal device and the second terminal device in the multicast manner based on the first SN.

In a possible implementation, if the network device uses SN2 as the first SN, the network device uses an SN obtained by adding 1 to the first SN, as the SN of the initial data packet to be sent by the network device to the first terminal device and the second terminal device in the multicast manner.

The initial data packet sent by the network device to the first terminal device and the second terminal device in the multicast manner may be the $1^{st}$ data packet sent by the network device to the first terminal device and the second terminal device after the communication manner between the network device and each of the first terminal device and the second terminal device is switched from the unicast manner to the multicast manner.

FIG. 2 is used as an example. If the first terminal device is the terminal device 120 and the terminal device 130, and the second terminal device is the terminal device 140, SN2 is equal to 3, and the first SN is also 3. The data packet 6 is the initial data packet sent by the network device to the first terminal device and the second terminal device in the multicast manner, and an SN of the data packet 6 is 4.

In another possible implementation, if the network device uses, as the first SN, an SN obtained by adding 1 to SN2, the network device uses the first SN as the SN of the initial data packet to be sent by the network device to the first terminal device and the second terminal device in the multicast manner.

FIG. 2 is used as an example. If the first terminal device is the terminal device 120 and the terminal device 130, and the second terminal device is the terminal device 140, SN2 is equal to 3, and the first SN is 4. The data packet 6 is the initial data packet sent by the network device to the first terminal device and the second terminal device in the multicast manner, and an SN of the data packet 6 is 4.

Step 404: The first terminal device receives the data packet from the network device in the multicast manner based on the first SN.

Optionally, that the first terminal device receives the data packet from the network device in the multicast manner based on the first SN includes: The first terminal device determines, based on the first SN, an SN corresponding to a lower edge of a receive window in which the first terminal device is to receive the data packet in the multicast manner. Alternatively, the first terminal device determines, based on the first SN, the SN of the initial data packet to be received by the first terminal device in the multicast manner.

In a possible implementation, if the network device uses SN2 as the first SN, the first terminal device moves the lower edge of the receive window for receiving the data packet in the multicast manner to a position in which the SN is equal to the first SN added by 1. Alternatively, if the network device uses SN2 as the first SN, the first terminal device receives a data packet whose SN is larger than the first SN in the multicast manner.

FIG. 2 is used as an example. If the first terminal device is the terminal device 120 and the terminal device 130, and the second terminal device is the terminal device 140, SN2 is equal to 3, and the first SN is also 3. The data packet 6 is the initial data packet sent by the network device to the first terminal device and the second terminal device in the multicast manner, and the SN of the data packet 6 is 4. In this case, the first terminal device moves the lower edge of the receive window for receiving the data packet in the multicast manner to a position in which the SN is equal to 4, or the first terminal device receives a data packet whose SN is larger than 3 in the multicast manner.

In another possible implementation, if the network device uses, as the first SN, the SN obtained by adding 1 to SN2, the first terminal device moves the lower edge of the receive window for receiving the data packet in the multicast manner to a position in which the SN is equal to the first SN. Alternatively, if the network device uses, as the first SN, the SN obtained by adding 1 to SN2, the first terminal device receives a data packet whose SN is larger than or equal to the first SN in the multicast manner.

FIG. 2 is used as an example. If the first terminal device is the terminal device 120 and the terminal device 130, and the second terminal device is the terminal device 140, SN2 is equal to 3, and the first SN is 4. The data packet 6 is the initial data packet sent by the network device to the first terminal device and the second terminal device in the multicast manner, and the SN of the data packet 6 is 4. In this case, the first terminal device moves the lower edge of the receive window for receiving the data packet in the multicast manner to a position in which the SN is equal to 4, or the first terminal device receives a data packet whose SN is larger than or equal to 4 in the multicast manner.

Step 405: The second terminal device receives the data packet from the network device in the multicast manner.

During specific implementation, in an embodiment, the SN of the initial data packet received by the second terminal device in the multicast manner and SN2 are consecutive because the first SN is determined based on SN2. Therefore, the second terminal device may directly receive the data packet from the network device in the multicast manner.

During specific implementation, in an embodiment, the second terminal device receives the related configuration information about receiving the data packet from the network device in the multicast manner, and the second terminal device receives the data packet from the network device based on the related configuration information.

During specific implementation, in an embodiment, the second terminal device receives, from the network device, the indication information used to indicate that the communication manner between the network device and each of the first terminal device and the second terminal device is switched from the unicast manner to the multicast manner, and the second terminal device receives the data packet from the network device in the multicast manner.

During specific implementation, in an embodiment, the second terminal device receives the first indication information from the network device, and the second terminal device receives the data packet from the network device in the multicast manner based on the first SN. In this case, a process of step 405 is similar to a process of step 404. Therefore, for description of step 405, refer to the description in step 404. Details are not described herein again.

It should be noted that an execution sequence of step 404 and step 405 is not limited in this embodiment of this application. For example, step 404 may be performed before step 405. Alternatively, step 405 may be performed before step 404. Alternatively, step 404 and step 405 may be simultaneously performed.

According to the method shown in FIG. 4, when the communication manner between the network device and each of the first terminal device and the second terminal device is switched from the unicast manner to the multicast manner, the network device may send the first indication information including the first SN to the first terminal device, and send the data packet to the first terminal device and the second terminal device in the multicast manner based on the first SN, so that the network device may determine, based on the first SN, the SN of the data packet to be sent to the first terminal device and the second terminal device in the multicast manner.

Further, optionally, in the first implementation scenario of the method shown in FIG. 4, when the maximum sequence number SN1 of the data packet sent by the network device to the first terminal device in the unicast manner is smaller than the maximum sequence number SN2 of the data packet sent by the network device to the second terminal device in the unicast manner, and if content of the data packets that are sent by the network device to the first terminal device and the second terminal device and that have the maximum sequence numbers is the same, the network device sends a first data packet including only a packet header to the first terminal device, to avoid that the SN of the initial data packet received by the first terminal device in the multicast manner and the maximum SN of the data packet received by the first terminal device in the unicast manner are not consecutive after the communication manner between the network device and each of the first terminal device and the second terminal device is switched from the unicast manner to the multicast manner; or if content of the data packets that are sent by the network device to the first terminal device and the second terminal device and that have the maximum sequence numbers is different, the network device sends a first data packet including a data packet that has not been received by the first terminal device in the unicast manner, to avoid that the data packet that has not been received by the first terminal device in the unicast manner exists after the communication manner between the network device and each of the first terminal device and the second terminal device is switched from the unicast manner to the multicast manner. Specifically, the method is shown in FIG. 5.

Figure 5:
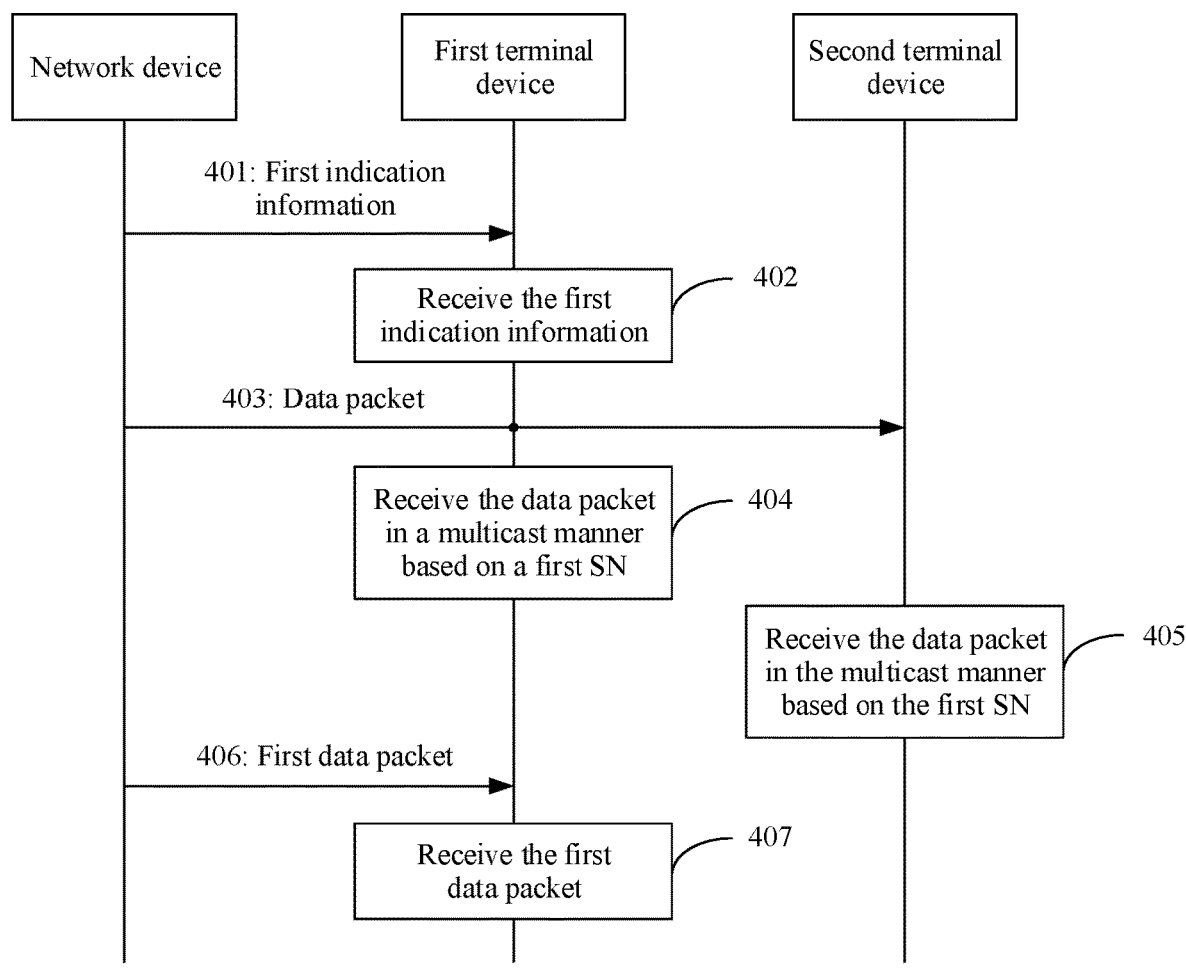
FIG. 5 is a schematic flowchart 2 of a data transmission method according to an embodiment of this application.

As shown in FIG. 5, the method shown in FIG. 4 further includes step 406 and step 407.

Step 406: The network device sends the first data packet to the first terminal device in the unicast manner.

It should be noted that the data packets that are sent by the network device to the first terminal device and the second terminal device in the unicast manner and that have the maximum sequence numbers may be the same or different. For example, in FIG. 6, a data packet that is sent by the network device to the terminal device 120 and that has a maximum sequence number is a data packet 5, where an SN of the data packet 5 is 5. A data packet that is sent by the network device to the terminal device 130 and that has a maximum sequence number is also the data packet 5, where an SN of the data packet 5 is 4. A data packet that is sent by the network device to the terminal device 140 and that has a maximum sequence number is also the data packet 5, where an SN of the data packet 5 is 3. For another example, in FIG. 2, the data packet that is sent by the network device to the terminal device 120 and that has the maximum sequence number is the data packet 5, where the SN of the data packet 5 is 5. The data packet that is sent by the network device to the terminal device 130 and that has the maximum sequence number is the data packet 4, where the SN of the data packet 4 is 4. The data packet that is sent by the network device to the terminal device 140 and that has the maximum sequence number is the data packet 3, where the SN of the data packet 3 is 3. The data packet 5, the data packet 4, and the data packet 3 are different.

In a possible implementation, the first data packet is a data packet including only a packet header, and an SN of the first data packet includes SN2 and/or at least one SN between SN2 and SN1.

If the maximum sequence number SN1 of the data packet sent by the network device to the first terminal device in the unicast manner is smaller than the maximum sequence number SN2 of the data packet sent by the network device to the second terminal device in the unicast manner, and if the content of the data packets that are sent by the network device to the first terminal device and the second terminal device in the unicast manner and that have the maximum sequence numbers is the same, and the SN of the initial data packet sent by the network device to the first terminal device and the second terminal device in the multicast manner is SN2+1, a receiving hole occurs on the first terminal device, to be specific, the first terminal device has not received a data packet whose SN is larger than SN1 and smaller than SN2+1 before receiving the data packet whose SN is SN2+1. Because the content of the data packets that are sent by the network device to the first terminal device and the second terminal device and that have the maximum sequence numbers is the same, there is actually no content of a data packet that has not been received in the unicast manner on a first terminal device side, but SNs of the data packets that are received are not consecutive. In this case, the first terminal device side may consider that there is content of a data packet that is not received. Therefore, the network device may send the first data packet to the first terminal device, where the first data packet is a data packet including only the packet header, and the SN of the first data packet includes SN2 and/or at least one SN between SN2 and SN1. After the first terminal device receives the data packet including only the packet header, a case in which the SNs of the data packets received by the first terminal device are not consecutive can be avoided.

Figure 6:
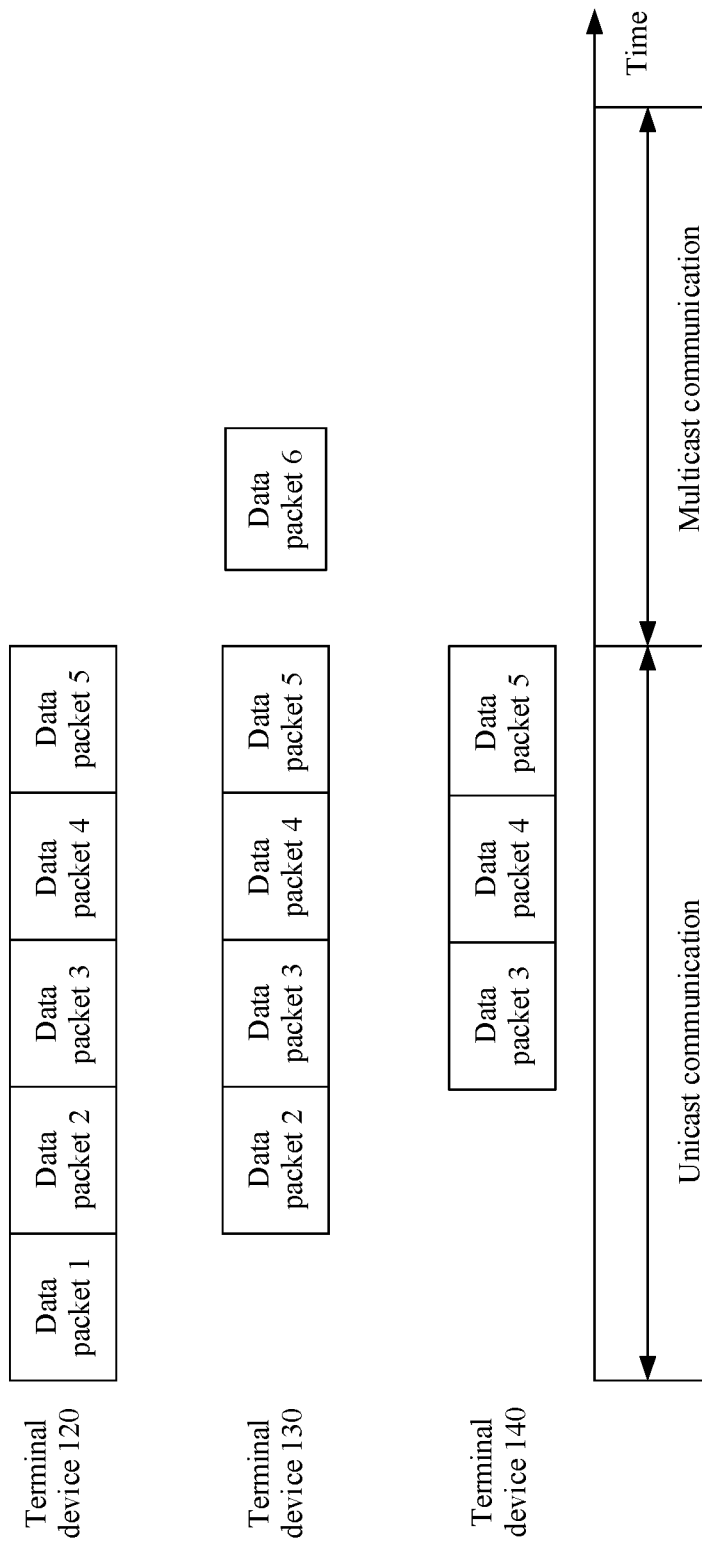
FIG. 6 is a schematic diagram 2 of data transmission according to an embodiment of this application.

FIG. 6 is used as an example. The first terminal device is the terminal device 130 and the terminal device 140, and the second terminal device is the terminal device 120. The maximum sequence number of the data packet sent by the network device to the terminal device 120 in the unicast manner is 5 (namely, the SN of the data packet 5). The maximum sequence number of the data packet sent by the network device to the terminal device 130 in the unicast manner is 4 (namely, the SN of the data packet 5). The maximum sequence number of the data packet sent by the network device to the terminal device 140 in the unicast manner is 3 (namely, the SN of the data packet 5). The sequence number of the initial data packet sent by the network device to the terminal devices 120 to 140 in the multicast manner is 6 (namely, an SN of a data packet 6). In this case, for the terminal device 130, the terminal device 130 has not received a data packet whose sequence number is 5, and for the terminal device 140, the terminal device 140 has not received data packets whose sequence numbers are 4 and 5. However, actually, on a terminal device 130 side and a terminal device 140 side, there is no data packet that has not been received in the unicast manner. Therefore, the network device may send one null data packet (a data packet including only a packet header) to the terminal device 130, where an SN of the null data packet is 5. The network device may send two null data packets (data packets including only packet headers) to the terminal device 140, where SNs of the null data packets are 4 and 5.

It should be noted that the first terminal device may determine, based on the first SN, the SN corresponding to the lower edge of the receive window in which the first terminal device is to receive the data packet in the multicast manner. Alternatively, the first terminal device may determine, based on the first SN, the SN of the initial data packet to be received by the first terminal device in the multicast manner. Therefore, the network device may alternatively not send the first data packet to the first terminal device, and the first terminal device may directly receive the data packet from the network device in the multicast manner.

For example, in FIG. 6, after receiving the data packet 5 whose SN is 4 from the network device, the terminal device 130 receives the first indication information from the network device, and determines, based on the first SN included in the first indication information, that the SN of the initial data packet to be received by the first terminal device in the multicast manner is 6. The first terminal device directly receives the data packet 6 whose SN is 6 from the network device in the multicast manner.

In another possible implementation, an SN of the first data packet includes SN2 and/or at least one SN between SN2 and SN1.

If the maximum sequence number SN1 of the data packet sent by the network device to the first terminal device in the unicast manner is smaller than the maximum sequence number SN2 of the data packet sent by the network device to the second terminal device in the unicast manner, and if the data packets that are sent by the network device to the first terminal device and the second terminal device in the unicast manner and that have the maximum sequence numbers are not the same, and the SN of the initial data packet sent by the network device to the first terminal device and the second terminal device in the multicast manner is SN2+1, a data packet that has not been received by the first terminal device in the unicast manner exists. Therefore, the network device may send the first data packet to the first terminal device, where the first data packet includes the data packet that has not been received by the first terminal device in the unicast manner. The SN of the first data packet includes SN2 and/or at least one SN between SN2 and SN1.

FIG. 2 is used as an example. The first terminal device is the terminal device 130 and the terminal device 140, and the second terminal device is the terminal device 120. The maximum sequence number of the data packet sent by the network device to the terminal device 120 in the unicast manner is 5 (namely, the SN of the data packet 5). The maximum sequence number of the data packet sent by the network device to the terminal device 130 in the unicast manner is 4 (namely, the SN of the data packet 4). The maximum sequence number of the data packet sent by the network device to the terminal device 140 in the unicast manner is 3 (namely, the SN of the data packet 3). The sequence number of the initial data packet sent by the network device to the terminal devices 120 to 140 in the multicast manner is 6 (namely, the SN of the data packet 6). In this case, for the terminal device 130, the terminal device 130 has not received the data packet 5 whose sequence number is 5 in the unicast manner, and for the terminal device 140, the terminal device 140 has not received the data packet 4 whose sequence number is 4 and the data packet 5 whose sequence number is 5 in the unicast manner. Therefore, the network device may send the data packet 5 to the terminal device 130. The network device may send the data packet 4 and the data packet 5 to the terminal device 140.

Optionally, after the network device sends, in the unicast manner, the data packet that has not been received by the first terminal device in the unicast manner to the first terminal device, the network device deactivates the unicast manner or releases a radio bearer corresponding to the unicast manner.

For example, after the network device sends, in the unicast manner, the data packet that has not been received by the first terminal device in the unicast manner to the first terminal device, the network device sends RRC signaling or a MAC CE to the first terminal device, where the RRC signaling or the MAC CE carries third indication information, and the third indication information is used to indicate that the network device is to stop transmitting data in the unicast manner and is to transmit subsequent data in the multicast manner. In the multicast manner, a radio bearer that is the same as or different from that in the unicast manner may be used for data transmission.

Step 407: The first terminal device receives the first data packet from the network device in the unicast manner.

It should be noted that an execution sequence of steps 404 and 405 and steps 406 and 407 is not limited in this embodiment of this application. For example, steps 404 and 405 may be performed before steps 406 and 407, steps 406 and 407 may be performed before steps 404 and 405, or steps 404 and 405 and steps 406 and 407 may be simultaneously performed.

According to the method shown in FIG. 5, if the maximum sequence number SN1 of the data packet sent by the network device to the first terminal device in the unicast manner is smaller than the maximum sequence number SN2 of the data packet sent by the network device to the second terminal device in the unicast manner, and if the data packets that are sent by the network device to the first terminal device and the second terminal device in the unicast manner and that have the maximum sequence numbers are the same, the network device may send the first data packet to the first terminal device, where the first data packet is a data packet including only a packet header, and the SN of the first data packet includes SN2 and/or at least one SN between SN2 and SN1, to avoid the receiving hole on the first terminal device side. If the maximum sequence number SN1 of the data packet sent by the network device to the first terminal device in the unicast manner is smaller than the maximum sequence number SN2 of the data packet sent by the network device to the second terminal device in the unicast manner, and if the data packets that are sent by the network device to the first terminal device and the second terminal device in the unicast manner and that have the maximum sequence numbers are not the same, the network device may send the first data packet to the first terminal device, where the first data packet includes the data packet that has not been received by the first terminal device in the unicast manner. The SN of the first data packet includes SN2 and/or at least one SN between SN2 and SN1, to avoid that the data packet that has not been received by the first terminal device in the unicast manner exists.

Further, optionally, in the second implementation scenario of the method shown in FIG. 4, when the maximum sequence number SN1 of the data packet sent by the network device to the first terminal device in the unicast manner is larger than the maximum sequence number SN2 of the data packet sent by the network device to the second terminal device in the unicast manner, the first terminal device receives a data packet whose SN is duplicate. The network device sends second indication information to the first terminal device, where the second indication information is used to indicate an SN of a data packet on which the first terminal device is to skip performing duplicate detection, to avoid that the first terminal device discards the data packet whose SN is duplicate. Specifically, the method is shown in FIG. 7.

Figure 7:
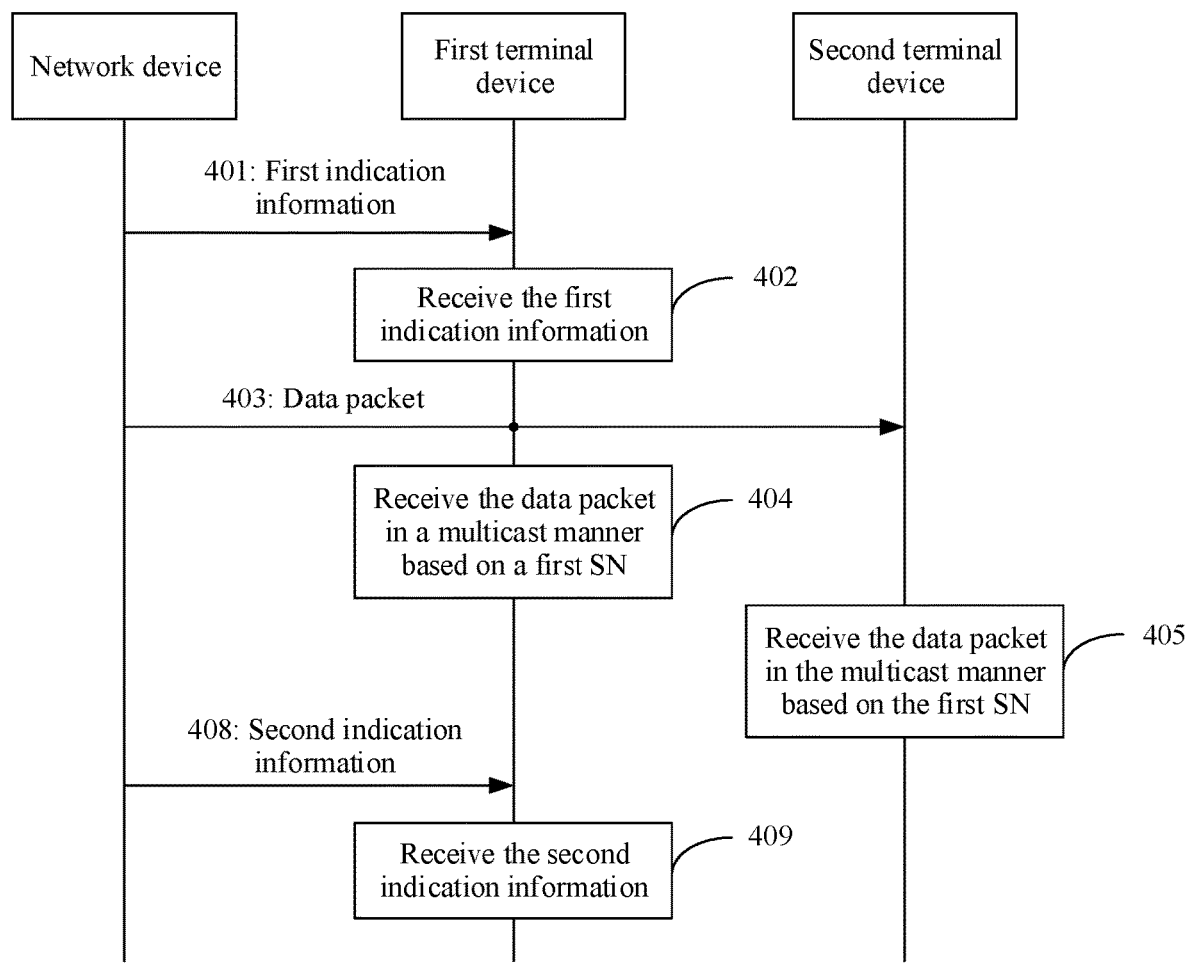
FIG. 7 is a schematic flowchart 3 of a data transmission method according to an embodiment of this application.

As shown in FIG. 7, the method shown in FIG. 4 further includes step 408 and step 409.

Step 408: The network device sends the second indication information to the first terminal device.

The second indication information is used to indicate the SN of the data packet on which the first terminal device is to skip performing duplicate detection. Skipping duplicate detection means that when data packets with a same SN are received, no data packets corresponding to the SN are discarded.

The SN of the data packet on which the first terminal device is to skip performing duplicate detection includes SN1 and/or at least one SN between SN2 and SN1.

In a possible implementation, the second indication information includes the SN of the data packet on which the first terminal device is to skip performing duplicate detection, so that after the first terminal device receives the second indication information, the first terminal device determines, based on the SN that is included in the second indication information and that is of the data packet on which the first terminal device is to skip performing duplicate detection, the SN of the data packet on which the first terminal device is to skip performing duplicate detection.

For example, if the second indication information includes 2, 3, and 4, after the first terminal device receives the second indication information, the first terminal device skips performing duplicate detection on data packets whose SNs are 2 to 4.

In another possible implementation, the second indication information includes the SN of the initial data packet to be sent by the network device to the first terminal device and the second terminal device in the multicast manner, so that after the first terminal device receives the second indication information, the first terminal device determines to skip performing duplicate detection on a data packet whose SN is larger than or equal to the SN of the initial data packet.

For example, if the second indication information includes 2, after the first terminal device receives the second indication information, the first terminal device determines to skip performing duplicate detection on a data packet whose SN is larger than or equal to 2.

If the maximum sequence number SN1 of the data packet sent by the network device to the first terminal device in the unicast manner is larger than the maximum sequence number SN2 of the data packet sent by the network device to the second terminal device in the unicast manner, the first terminal device may receive a data packet whose SN is duplicate. In this case, if the first terminal device performs duplicate detection, the data packet whose SN is duplicate is discarded. Therefore, the network device may send the second indication information to the first terminal device, where the second indication information is used to indicate the SN of the data packet on which the first terminal device is to skip performing duplicate detection.

For example, in FIG. 2, the first terminal device is the terminal device 120 and the terminal device 130, and the second terminal device is the terminal device 140. The network device sends the data packet 1 to the data packet 5 to the terminal device 120 in the unicast manner, where the SNs of the data packet 1 to the data packet 5 are 1, 2, 3, 4, and 5 respectively. The network device sends the data packet 1 to the data packet 4 to the terminal device 130 in the unicast manner, where the SNs of the data packet 1 to the data packet 4 are 1, 2, 3, and 4 respectively. The network device sends the data packet 1 to the data packet 3 to the terminal device 140 in the unicast manner, where the SNs of the data packet 1 to the data packet 3 are 1, 2, and 3 respectively. The sequence number of the initial data packet sent by the network device to the terminal devices 120 to 140 in the multicast manner is 4 (namely, the SN of the data packet 6). In this case, for the terminal device 120, the terminal device 120 has received the data packets whose SNs are 4 and 5. Therefore, if the terminal device 120 performs duplicate detection, data packets whose SNs are 4 and 5 that are received in the multicast manner are discarded. Therefore, the network device may send the second indication information to the terminal device 120, where the second indication information is used to indicate to skip performing duplicate detection on the data packets whose SNs are 4 and 5. After receiving the data packets whose SNs are 4 and 5, the terminal device 120 delivers the data packets whose SNs are 4 and 5 to an upper layer in a receiving sequence. Similarly, the network device may send the second indication information to the terminal device 130, where the second indication information is used to indicate to skip performing duplicate detection on a data packet whose SN is 5. After the terminal device 130 receives the data packet whose SN is 5, the terminal device 130 delivers the data packet to the upper layer.

Optionally, the second indication information is carried in a PDU, a MAC CE, RRC, or DCI.

For example, the network device sends the DCI to the first terminal device, where the DCI carries the second indication information, and the second indication information is used to indicate the SN of the data packet on which the first terminal device is to skip performing duplicate detection.

Step 409: The first terminal device receives the second indication information from the network device.

It should be noted that an execution sequence of steps 404 and 405 and steps 408 and 409 is not limited in this embodiment of this application. For example, steps 404 and 405 may be performed before steps 408 and 409, steps 408 and 409 may be performed before steps 404 and 405, or steps 404 and 405 and steps 408 and 409 may be simultaneously performed.

It should be noted that the data transmission method provided in this embodiment of this application may alternatively not include step 408 and step 409.

In a possible implementation, if the maximum sequence number SN1 of the data packet sent by the network device to the first terminal device in the unicast manner is larger than the maximum sequence number SN2 of the data packet sent by the network device to the second terminal device in the unicast manner, the first indication information in step 401 may be further used to indicate the SN of the data packet on which the first terminal device is to skip performing duplicate detection.

In another possible implementation, if the maximum sequence number SN1 of the data packet sent by the network device to the first terminal device in the unicast manner is larger than the maximum sequence number SN2 of the data packet sent by the network device to the second terminal device in the unicast manner, the first terminal device deduces, based on the first SN included in the first indication information in step 401, the SN of the data packet on which duplicate detection is to be skipped.

For example, SN1 is equal to 8, SN2 is equal to 3, and the first SN is equal to SN2+1. After receiving the first indication information, the first terminal device may determine that the first SN is 4 based on the first indication information. Because SN1 is 8, the first terminal device may deduce that SNs of data packets on which duplicate detection is to be skipped include 4, 5, 6, 7, and 8.

According to the method shown in FIG. 7, when the maximum sequence number SN1 of the data packet sent by the network device to the first terminal device in the unicast manner is larger than the maximum sequence number SN2 of the data packet sent by the network device to the second terminal device in the unicast manner, the network device may send the second indication information to the first terminal device, where the second indication information is used to indicate the SN of the data packet on which the first terminal device is to skip performing duplicate detection, so that the first terminal device may receive, after the communication manner between the network device and the first terminal device is switched from the unicast manner to the multicast manner, the data packet sent by the network device in the multicast manner.

The foregoing mainly describes the solutions provided in the embodiments of this application from a perspective of interaction between network elements. It may be understood that to implement the foregoing functions, the foregoing first terminal device, the network device, or the like includes a corresponding hardware structure and/or software module for performing each function. A person skilled in the art should be easily aware that, in combination with units and algorithm operations of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, the network device may be divided into function modules based on the foregoing method examples. For example, each function module may be obtained through division for each corresponding function, or two or more functions may be integrated into one processing module. The integrated module may be implemented in a form of hardware, or may be implemented in a form of a software function module. It should be noted that, in the embodiments of this application, division into the modules is an example, and is merely a logical function division. In an actual implementation, another division manner may be used.

Figure 8:
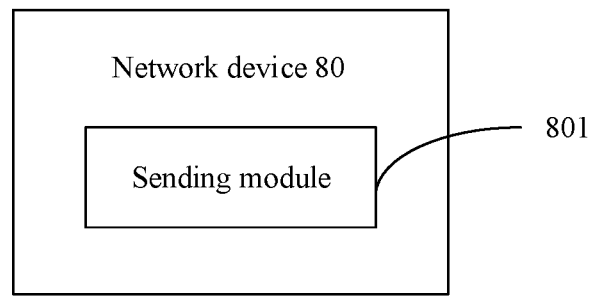
FIG. 8 is a schematic diagram of a structure of a network device according to an embodiment of this application.

For example, if function modules are obtained through division in an integrated manner, FIG. 8 is a schematic diagram of a structure of a network device 80. The network device 80 includes a sending module 801.

The sending module 801 is configured to send first indication information to a first terminal device, where the first indication information includes a first sequence number SN, and the first indication information is used to indicate the first terminal device to receive a data packet in a multicast manner.

The sending module 801 is further configured to send the data packet to the first terminal device and a second terminal device in the multicast manner based on the first SN.

Optionally, the first SN is determined based on a maximum sequence number SN2 of a data packet sent by the network device to the second terminal device in a unicast manner.

Optionally, when a maximum sequence number SN1 of a data packet sent by the network device to the first terminal device in the unicast manner is smaller than the maximum sequence number SN2 of the data packet sent by the network device to the second terminal device in the unicast manner, the sending module 801 is further configured to send a first data packet to the first terminal device in the unicast manner, where the first data packet is a data packet including only a packet header, and an SN of the first data packet includes SN2 and/or at least one SN between SN2 and SN1. Alternatively, the sending module 801 is further configured to send a first data packet to the first terminal device in the unicast manner, where an SN of the first data packet includes SN2 and/or at least one SN between SN2 and SN1.

Optionally, when a maximum sequence number SN1 of a data packet sent by the network device to the first terminal device in the unicast manner is larger than the maximum sequence number SN2 of the data packet sent by the network device to the second terminal device in the unicast manner, the sending module 801 is further configured to send second indication information to the first terminal device, where the second indication information is used to indicate an SN of a data packet on which the first terminal device is to skip performing duplicate detection, and the SN of the data packet on which duplicate detection is to be skipped includes SN1 and/or at least one SN between SN1 and SN2.

Optionally, the first indication information is carried in a control protocol data unit PDU, a media access control control element, radio resource control signaling, or downlink control information.

Optionally, the second indication information is carried in a control protocol data unit PDU, a media access control control element, radio resource control signaling, or downlink control information.

All related content of the operations in the foregoing method embodiment may be cited in function descriptions of the corresponding function modules. Details are not described herein again.

In this embodiment, the network device 80 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the form shown in FIG. 3 may be used for the network device 80.

For example, the processor 301 in FIG. 3 may invoke computer-executable instructions stored in the memory 303, so that the network device 80 performs the data transmission method in the foregoing method embodiment.

For example, functions/implementation processes of the sending module 801 in FIG. 8 may be implemented by the processor 301 in FIG. 3 by invoking the computer-executable instructions stored in the memory 303. Alternatively, functions/implementation processes of the sending module 801 in FIG. 8 may be implemented by the communication interface 304 in FIG. 3.

Because the network device 80 provided in this embodiment may perform the foregoing data transmission method, for a technical effect that can be achieved by the network device 80, refer to the foregoing method embodiment. Details are not described herein again.

In this embodiment of this application, the first terminal device may be divided into function modules based on the foregoing method examples. For example, each function module may be obtained through division for each corresponding function, or two or more functions may be integrated into one processing module. The integrated module may be implemented in a form of hardware, or may be implemented in a form of a software function module. It should be noted that, in the embodiments of this application, division into the modules is an example, and is merely a logical function division. In an actual implementation, another division manner may be used.

Figure 9:
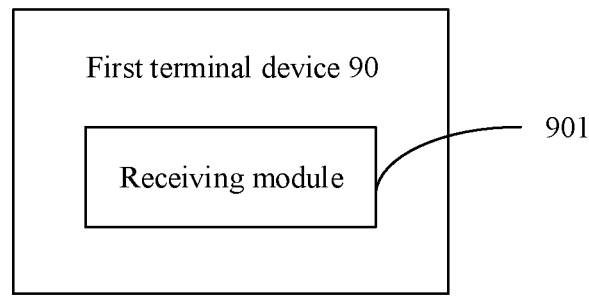
FIG. 9 is a schematic diagram of a structure of a first terminal device according to an embodiment of this application.

For example, if function modules are obtained through division in an integrated manner, FIG. 9 is a schematic diagram of a structure of a first terminal device 90. The first terminal device 90 includes a receiving module 901.

The receiving module 901 is configured to receive first indication information from a network device, where the first indication information includes a first sequence number SN, and the first indication information is used to indicate the first terminal device to receive a data packet in a multicast manner.

The receiving module 901 is further configured to receive the data packet from the network device in the multicast manner based on the first SN.

Optionally, the receiving module 901 is specifically configured to determine, based on the first SN, an SN corresponding to a lower edge of a receive window in which the first terminal device is to receive the data packet in the multicast manner. Alternatively, the receiving module 901 is specifically configured to determine, based on the first SN, an SN of an initial data packet to be received by the first terminal device in the multicast manner.

Optionally, the first SN is determined based on a maximum sequence number SN2 of a data packet sent by the network device to a second terminal device in a unicast manner.

Optionally, when a maximum sequence number SN1 of a data packet sent by the network device to the first terminal device in the unicast manner is smaller than the maximum sequence number SN2 of the data packet sent by the network device to the second terminal device in the unicast manner, the receiving module 901 is further configured to receive a first data packet from the network device in the unicast manner, where the first data packet is a data packet including only a packet header, and an SN of the first data packet includes SN2 and/or at least one SN between SN2 and SN1.

Alternatively, the receiving module 901 is further configured to receive a first data packet from the network device in the unicast manner, where an SN of the first data packet includes SN2 and/or at least one SN between SN2 and SN1.

Optionally, when a maximum sequence number SN1 of a data packet sent by the network device to the first terminal device in the unicast manner is larger than the maximum sequence number SN2 of the data packet sent by the network device to the second terminal device in the unicast manner, the receiving module 901 is further configured to receive second indication information from the network device, where the second indication information is used to indicate an SN of a data packet on which the first terminal device is to skip performing duplicate detection, and the SN of the data packet on which duplicate detection is to be skipped includes SN1 and/or at least one SN between SN1 and SN2.

Optionally, the first indication information is carried in a control protocol data unit PDU, a media access control control element, radio resource control signaling, or downlink control information.

Optionally, the second indication information is carried in a control protocol data unit PDU, a media access control control element, radio resource control signaling, or downlink control information.

All related content of the operations in the foregoing method embodiment may be cited in function descriptions of the corresponding function modules. Details are not described herein again.

In this embodiment, the first terminal device 90 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the form shown in FIG. 3 may be used for the first terminal device 90.

For example, the processor 301 in FIG. 3 may invoke computer-executable instructions stored in the memory 303, so that the first terminal device 90 performs the data transmission method in the foregoing method embodiment.

For example, functions/implementation processes of the receiving module 901 in FIG. 9 may be implemented by the processor 301 in FIG. 3 by invoking the computer-executable instructions stored in the memory 303. Alternatively, functions/implementation processes of the receiving module 901 in FIG. 9 may be implemented by the communication interface 304 in FIG. 3.

Because the first terminal device 90 provided in this embodiment may perform the foregoing data transmission method, for a technical effect that can be achieved by the first terminal device 90, refer to the foregoing method embodiment. Details are not described herein again.

Figure 10:
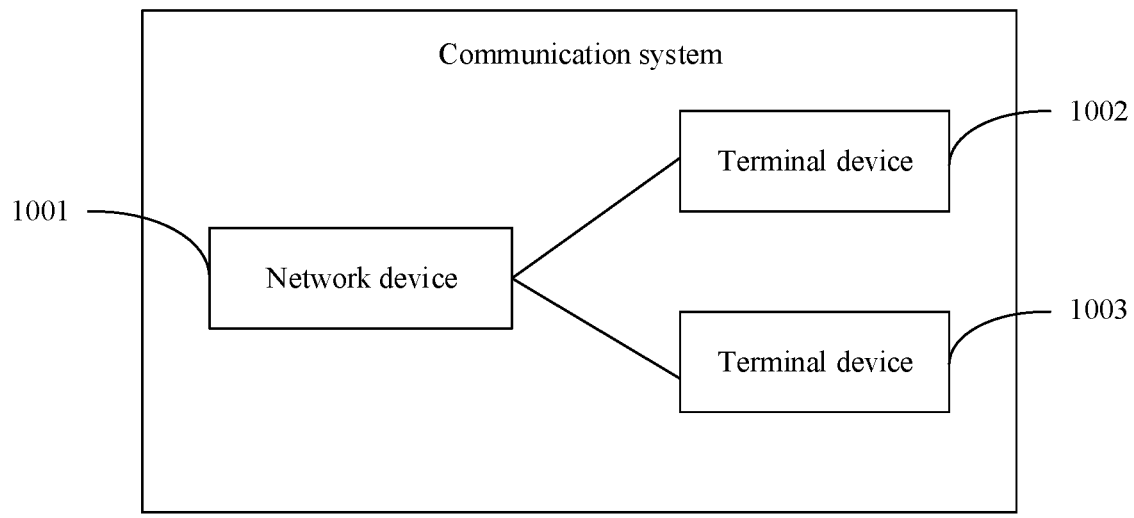
FIG. 10 is a schematic diagram of a structure of a communication system according to an embodiment of this application.

FIG. 10 is a schematic diagram of a composition of a communication system. As shown in FIG. 10, the communication system may include a network device 1001, a terminal device 1002, and a terminal device 1003. It should be noted that FIG. 10 is merely an example of an accompanying drawing. Network elements included in the communication system shown in FIG. 10 and a quantity of the network elements are not limited in this embodiment of this application.

The network device 1001 has a function of the network device 80 shown in FIG. 8, and may be configured to send first indication information to the terminal device 1002, and send a data packet to the terminal device 1002 and the terminal device 1003 in a multicast manner based on a first SN included in the first indication information.

The terminal device 1002 has a function of the first terminal device 90 shown in FIG. 9, and may be configured to receive the first indication information from the network device 1001, and receive the data packet from the network device 1001 in the multicast manner based on the first SN included in the first indication information.

The terminal device 1003 may be configured to receive the data packet from the network device 1001 in the multicast manner.

It should be noted that all related content of the steps in the foregoing method embodiment may be cited in function descriptions of corresponding network elements of the communication system. Details are not described herein again.

All or a part of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely examples, and modifications, variations, combinations or equivalents may fall within the scope of this application. It is clear that a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. A data transmission method, comprising:
  sending, by a network device, first indication information to a first terminal device, wherein the first indication information comprises a first sequence number (SN), wherein the first SN is determined based on a maximum sequence number SN2 of a data packet sent by the network device to a second terminal device in a unicast manner, and wherein the first indication information indicates that the first terminal device is to receive a data packet in a multicast manner; and
  sending, by the network device, the data packet to the first terminal device and the second terminal device in the multicast manner based on the first SN.

2. The method according to claim 1, wherein based on a maximum sequence number SN1 of a data packet sent by the network device to the first terminal device in a unicast manner being smaller than the maximum sequence number SN2 of the data packet sent by the network device to the second terminal device in the unicast manner, the method further comprises:
  sending, by the network device, a first data packet to the first terminal device in the unicast manner, wherein an SN of the first data packet comprises at least one SN between SN2 and SN1.

3. The method according to claim 1, wherein based on a maximum sequence number SN1 of a data packet sent by the network device to the first terminal device in a unicast manner being larger than the maximum sequence number SN2 of the data packet sent by the network device to the second terminal device in the unicast manner, the method further comprises:
  sending, by the network device, second indication information to the first terminal device, wherein the second indication information indicates an SN of a data packet on which the first terminal device is to skip performing duplicate detection, and wherein the SN of the data packet on which duplicate detection is to be skipped comprises at least one SN between SN1 and SN2.

4. The method according to claim 1, wherein the first indication information is carried in a control protocol data unit (PDU), a media access control control element, radio resource control signaling, or downlink control information.

5. A data transmission method, comprising:
  receiving, by a first terminal device, first indication information from a network device, wherein the first indication information comprises a first sequence number (SN), wherein the first SN is determined based on a maximum sequence number SN2 of a data packet sent by the network device to a second terminal device in a unicast manner, and wherein the first indication information indicates that the first terminal device is to receive a data packet in a multicast manner; and
  receiving, by the first terminal device, the data packet from the network device in the multicast manner based on the first SN.

6. The method according to claim 5, wherein receiving the data packet from the network device in the multicast manner based on the first SN comprises:
  determining, by the first terminal device based on the first SN, an SN corresponding to a lower edge of a receive window in which the first terminal device is to receive the data packet in the multicast manner: or determining, by the first terminal device based on the first SN, an SN of an initial data packet to be received by the first terminal device in the multicast manner.

7. The method according to claim 5, wherein based on a maximum sequence number SN1 of a data packet sent by the network device to the first terminal device in a unicast manner being smaller than the maximum sequence number SN2 of the data packet sent by the network device to the second terminal device in the unicast manner, the method further comprises:

receiving, by the first terminal device, a first data packet from the network device in the unicast manner, wherein an SN of the first data packet comprises at least one SN between SN2 and SN1.

8. The method according to claim 5, wherein based on a maximum sequence number SN1 of a data packet sent by the network device to the first terminal device in a unicast manner being larger than the maximum sequence number SN2 of the data packet sent by the network device to the second terminal device in the unicast manner, the method further comprises:

receiving, by the first terminal device, second indication information from the network device, wherein the second indication information indicates an SN of a data packet on which the first terminal device is to skip performing duplicate detection, and wherein the SN of the data packet on which duplicate detection is to be skipped comprises at least one SN between SN1 and SN2.

9. A communication apparatus, comprising:
one or more processors; and
a memory, wherein the memory stores processor-executable instructions:
wherein the one or more processors are configured to execute the processor-executable instructions to facilitate the following being performed by the communication apparatus:

sending first indication information to a first terminal device, wherein the first indication information comprises a first sequence number (SN), wherein the first SN is determined based on a maximum sequence number SN2 of a data packet sent by the communication apparatus to a second terminal device in a unicast manner, and wherein the first indication information indicates that the first terminal device is to receive a data packet in a multicast manner; and sending the data packet to the first terminal device and the second terminal device in the multicast manner based on the first SN.

10. The communication apparatus according to claim 9, wherein the one or more processors are further configured to execute the processor-executable instructions to facilitate the following being performed by the communication apparatus:

based on a maximum sequence number SN1 of a data packet sent by the communication apparatus to the first terminal device in a unicast manner being smaller than the maximum sequence number SN2 of the data packet sent by the communication apparatus to the second terminal device in the unicast manner, sending a first data packet to the first terminal device in the unicast manner, wherein an SN of the first data packet comprises at least one SN between SN2 and SN1.

11. The communication apparatus according to claim 9, wherein the one or more processors are further configured to execute the processor-executable instructions to facilitate the following being performed by the communication apparatus:

based on a maximum sequence number SN1 of a data packet sent by the communication apparatus to the first terminal device in a unicast manner being larger than the maximum sequence number SN2 of the data packet sent by the communication apparatus to the second terminal device in the unicast manner, sending second indication information to the first terminal device, wherein the second indication information indicates an SN of a data packet on which the first terminal device is to skip performing duplicate detection, and wherein the SN of the data packet on which duplicate detection is to be skipped comprises at least one SN between SN1 and SN2.

12. The communication apparatus according to claim 9, wherein the first indication information is carried in a control protocol data unit (PDU), a media access control control element, radio resource control signaling, or downlink control information.

13. A communication apparatus, comprising:
one or more processors; and
a memory, wherein the memory stores processor-executable instructions:
wherein the one or more processors are configured to execute the processor-executable instructions to facilitate the following being performed by the communication apparatus:

receiving first indication information from a network device, wherein the first indication information comprises a first sequence number (SN), wherein the first SN is determined based on a maximum sequence number SN2 of a data packet sent by the network device to a second terminal device in a unicast manner, and wherein the first indication information indicates that the communication apparatus is to receive a data packet in a multicast manner; and receiving the data packet from the network device in the multicast manner based on the first SN.

14. The communication apparatus according to claim 13, wherein the one or more processors are further configured to execute the processor-executable instructions to facilitate the following being performed by the communication apparatus:

determining, based on the first SN, an SN corresponding to a lower edge of a receive window in which the communication apparatus is to receive the data packet in the multicast manner: or determining, based on the first SN, an SN of an initial data packet to be received by the communication apparatus in the multicast manner.

15. The communication apparatus according to claim 13, wherein the one or more processors are further configured to execute the processor-executable instructions to facilitate the following being performed by the communication apparatus:

based on a maximum sequence number SN1 of a data packet sent by the network device to the communication apparatus in a unicast manner being smaller than the maximum sequence number SN2 of the data packet sent by the network device to the second terminal device in the unicast manner, receiving a first data packet from the network device in the unicast manner, wherein an SN of the first data packet comprises at least one SN between SN2 and SN1.

16. The communication apparatus according to claim 13, wherein the one or more processors are further configured to execute the processor-executable instructions to facilitate the following being performed by the communication apparatus:
- based on a maximum sequence number SN1 of a data packet sent by the network device to the communication apparatus in a unicast manner being larger than the maximum sequence number SN2 of the data packet sent by the network device to the second terminal device in the unicast manner, receiving second indication information from the network device, wherein the second indication information indicates an SN of a data packet on which the communication apparatus is to skip performing duplicate detection, and wherein the SN of the data packet on which duplicate detection is to be skipped comprises at least one SN between SN1 and SN2.

* * * * *

UNITED STATES PATENT AND TRADEMARK OFFICE
CERTIFICATE OF CORRECTION

| | | |
|---|---|---|
| PATENT NO. | : 12,225,409 B2 | Page 1 of 1 |
| APPLICATION NO. | : 17/677636 | |
| DATED | : February 11, 2025 | |
| INVENTOR(S) | : Xu et al. | |

It is certified that error appears in the above-identified patent and that said Letters Patent is hereby corrected as shown below:

In the Claims

Claim 6: Column 31, Line 2: "the data packet in the multicast manner: or" should read as -- the data packet in the multicast manner; or --.

Claim 9: Column 31, Line 35: "able instructions:" should read as -- able instructions; --.

Claim 13: Column 32, Line 26: "able instructions:" should read as -- able instructions; --.

Claim 14: Column 32, Line 50: "in the multicast manner: or" should read as -- in the multicast manner; or --.

Signed and Sealed this
Twenty-eighth Day of October, 2025

John A. Squires
*Director of the United States Patent and Trademark Office*